United States Patent [19]

Ono et al.

[11] Patent Number: 5,892,563

[45] Date of Patent: Apr. 6, 1999

[54] REFLECTIVE TYPE LIQUID CRYSTAL DISPLAY DEVICE

[75] Inventors: Akihiro Ono; Yasuo Yagi, both of Nakakoma-gun, Japan

[73] Assignee: Pioneer Electronic Corporation, Tokyo, Japan

[21] Appl. No.: 867,864

[22] Filed: Jun. 3, 1997

[30] Foreign Application Priority Data

Jun. 6, 1996 [JP] Japan ................................ 8-166816
Jul. 16, 1996 [JP] Japan ................................ 8-205250

[51] Int. Cl.$^6$ .................. G02F 1/1335; G02F 1/1337; G02F 1/1343
[52] U.S. Cl. ...................... 349/143; 349/114; 349/123
[58] Field of Search .................. 349/42, 43, 114, 349/123, 143

[56] References Cited

U.S. PATENT DOCUMENTS 5,193,017  3/1993  Iwai et al. ................................ 349/43
5,581,380  12/1996  Bergman .................................. 349/63
5,663,020  9/1997  Yamaue et al. .......................... 349/51

*Primary Examiner*—William L. Sikes
*Assistant Examiner*—Tiep H. Nguyen
*Attorney, Agent, or Firm*—Sughrue, Mion, Zinn, Macpeak & Seas, PLLC

[57] ABSTRACT

A reflective type liquid crystal display device includes: a semiconductor substrate; a transparent substrate having a transparent electrodes; a liquid crystal layer interposed between these substrates; switching elements being formed on the semiconductor substrate correspondingly to a pixel-array; and pixel-electrodes disposed in matrix over the switching elements correspondingly to the pixel-array. Each of the pixel-electrodes is made of a metal selected from a group of materials each generating an electric potential which is substantially the same as an electric potential occurring on each of the transparent electrodes. The reflective type liquid crystal display device is capable of preventing the generation of flicker caused by the battery-effect.

3 Claims, 4 Drawing Sheets

REFLECTIVE TYPE LIQUID CRYSTAL DISPLAY DEVICE

BACKGROUND OF THE INVENTION

1. Field of the Invention

The present invention relates to a reflective type liquid crystal display device.

2. Description of the Related Art

A cross sectional view of a reflective panel in a reflective type liquid crystal display device is shown in FIG. 4. The reflective panel comprises a silicon substrate 1, a glass substrate 6 facing the silicon substrate 1 and a liquid crystal layer 9 interposed and sealed between the silicon substrate 1 and the glass substrate 6. Plural MOS FETs 2 are formed and disposed in matrix on the surface of the silicon substrate 1 in the side of the liquid crystal layer 9. Plural pixel-electrodes 4 of aluminum are formed and disposed in matrix via the insulative layers 3 correspondingly and adjacent to the MOS FETs 2. The pixel-electrodes 4 and the MOS FETs 2 are covered with a protective layer 5. On the other hand, transparent electrodes 7 of ITO i.e., a solid solution of tin oxide ($SnO_2$) and indium oxide ($In_2O_3$) are uniformly disposed on a surface of the glass substrate 6 in the side of the liquid crystal layer 9. Black matrixes or the black stripes 95 are disposed on the transparent electrodes 7 correspondingly to the MOS FETs 2. In this case, the protective layer 5 is made of silicon oxide, silicon nitride, tantalum oxide, or polyimide. In the case that the pixel-electrodes 4 are covered with the protective layer 5 as mentioned above, the driving-voltage for driving the liquid crystal display device is apt to be high. Thus, there a possible way to remove the protective layer 5 in order to reduce such a driving-voltage. If so, the liquid crystal layer 9 will come in contact with the transparent electrodes 7 and the pixel-electrodes 4 resulting in occurrence of the so-called battery-effect. Thus, the difference of the reference electric potentials generated by the transparent electrodes 7 and the pixel-electrodes 4 of aluminum becomes very large. As a result, the driving-voltage is offset in direct current, so that the projected light includes flicker, which is revealed.

SUMMARY OF THE INVENTION

The present invention is made in view of the forgoing problem. It is therefore an object of the invention to provide a reflective type liquid crystal display device capable of preventing the generation of flicker caused by the battery-effect.

The reflective type liquid crystal display device in a first aspect of the invention comprises: a semiconductor substrate; a transparent substrate having a transparent electrodes; a liquid crystal layer interposed between these substrates; switching elements being formed on said semiconductor substrate correspondingly to a pixel-array; and pixel-electrodes disposed in matrix over the switching elements correspondingly to said pixel-array, wherein each of said pixel-electrodes is made of a metal selected from a group of materials each generating an electric potential which is substantially the same as an electric potential occurring on each of said transparent electrodes.

In a second aspect of the invention of the reflective type liquid crystal display device, said metal of said pixel-electrode is made of tungsten or titanium nitride.

DETAILED DESCRIPTION OF THE PREFERRED EMBODIMENTS

Figure 1:
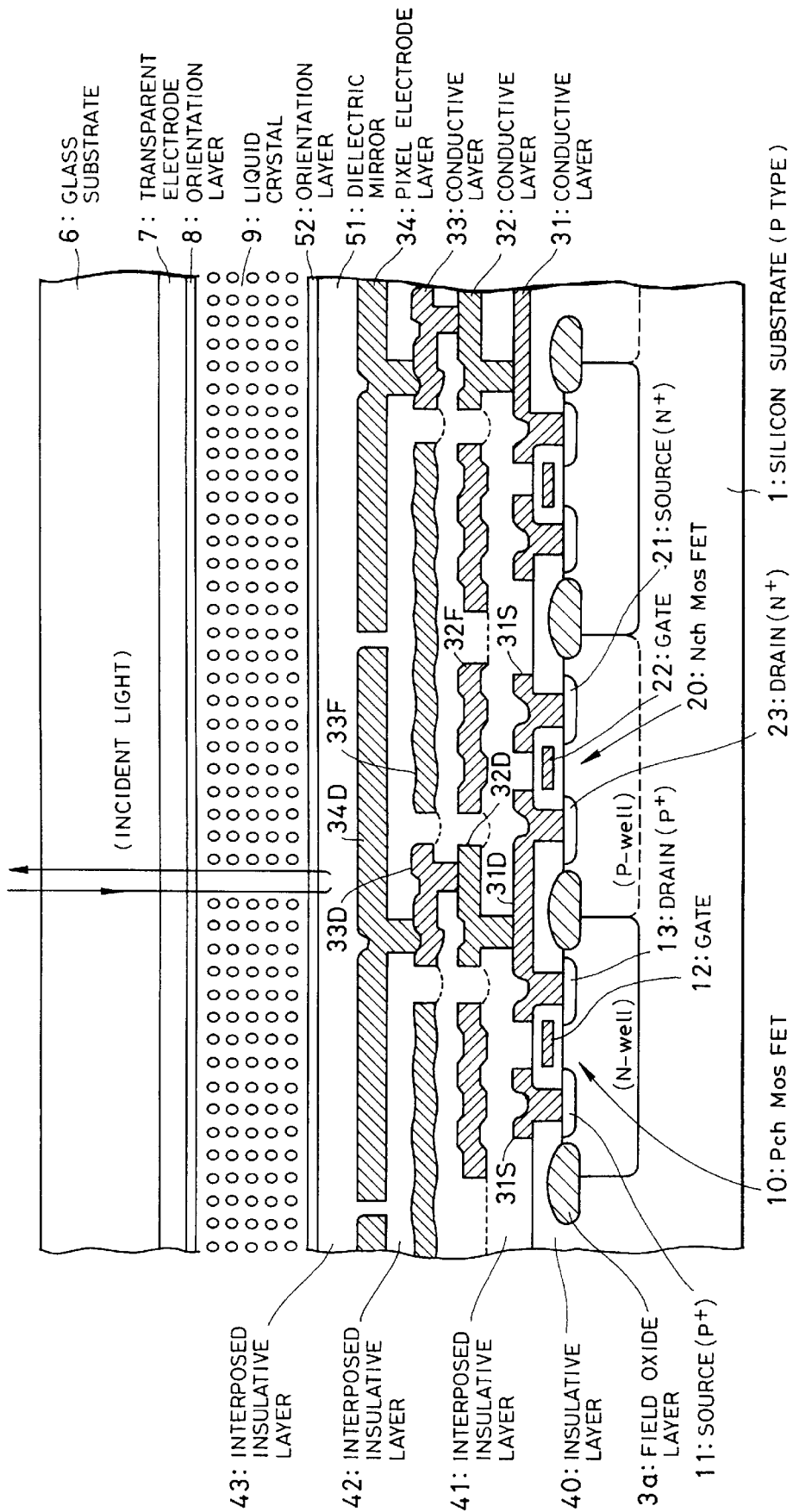
FIG. 1 is a schematic cross-sectional view of a reflective display panel in which a pixel portion of a plurality of pixels is partially enlarged.

An embodiment of the reflective type liquid crystal display device according to the invention will be explained with reference to the accompanying drawings. FIG. 1 is a schematic cross-sectional view of a reflective display panel in which a pixel portion of a plurality of pixels is partially enlarged.

In the reflective type liquid crystal display device, the display panel comprises a P type silicon substrate 1, a glass substrate 6 facing the silicon substrate 1 via spacers or the like, and a liquid crystal layer 9 interposed and sealed between the silicon substrate 1 and the glass substrate 6 by using a vacuum pump.

On the surface of the glass substrate 6 in the side of the liquid crystal layer 9, there are formed in turn transparent electrodes 7 of ITO or the like and an orientation layer 8 thereon. The ITO transparent electrodes 7 is maintained at a common voltage or the grounded. The orientation layer 8 is formed of a silicon oxide film layered on the ITO transparent electrodes by an inclined vacuum deposition.

The liquid crystal layer 9 includes a nematic i.e., vertical orientation type liquid crystal.

A P channel MOS transistor 10, a N channel MOS transistor 20, pixel-electrodes 34D, and drain lines 31D, 32D, 33D are formed on the surface of the silicon substrate 1 in the side of the liquid crystal layer 9 per one pixel. The pixels are disposed in matrix on the surface of the silicon substrate 1. In the P channel MOS transistor 10, its source 11 receives the data signal via the source line 31S, and its polysilicon gate 12 receives the scan-signal, and its drain 13 is connected to the drain line 31D. In the N channel MOS transistor 20, its source 21 receives the data signal via a source line 31S, and its polysilicon gate 22 receives the scan-signal, and its drain 23 is connected to the drain line 31D. The pixel-electrodes 34D are separated to the adjacent pixel-electrodes with insulative layers and disposed and patterned in a high density within the pixel-electrode layer 34 over the transistors 10, 20 and the drain lines 31D, 32D, 33D and the like. The drain lines 31D, 32D and 33D are formed and patterned within the conductive layers 31, 32 and 33 respectively to connect the drains of the transistors 10 and 20 to the pixel-electrodes 34D. The internal structures of the other pixels are similarly constructed as mentioned above.

In addition, there are an insulative layer 40 and interposed insulative layer 41, 42, 43 between the layer As including the transistors 10, 20 and the conductive layers 31, 32, 33 and the pixel-electrode layer 34 in such a manner that the insulative layer 40 and the interposed insulative layer 41, 42, 43 are alternatively layered. In this case, the conductive layer 31, 32, 33 are made of aluminum (Al) as thin films. The pixel-electrode layer 34 is made of a metal material generating an electric potential which is substantially the same as an electric potential occurring on the transparent electrodes 7 such as tungsten (W), titanium (Ti), titanium nitride (TiN) and the like. In addition, all of the insulative layers 40 to 43 are made of phosphorus silicate glass (PSG) as thin films.

Furthermore, a dielectric mirror 51 for reflecting the incident light is formed on the pixel-electrode layer 34. An orientation layer 52 is layered on the dielectric mirror 51. The orientation layer 8 is made of a silicon oxide film by the inclined vacuum deposition in which silicon oxide is deposited on the mirror in a direction inclined to the normal line thereof. The dielectric mirror 51 is a multi-layer formed by an electron beam (EB) vapor deposition which is a porous state. In addition, the orientation layers 8, 52 are also porous.

The reflective type liquid crystal display device having the structure mentioned above may be manufactured through a silicon process for general CMOS devices or a process for manufacture of liquid crystal layer panels.

Dummy patterns 33F and the like are disposed under the gap between the pixel-electrodes 34D and the adjacent pixel-electrodes to prevent the leaked incident light from reaching the transistors 10, 20.

Figure 2:
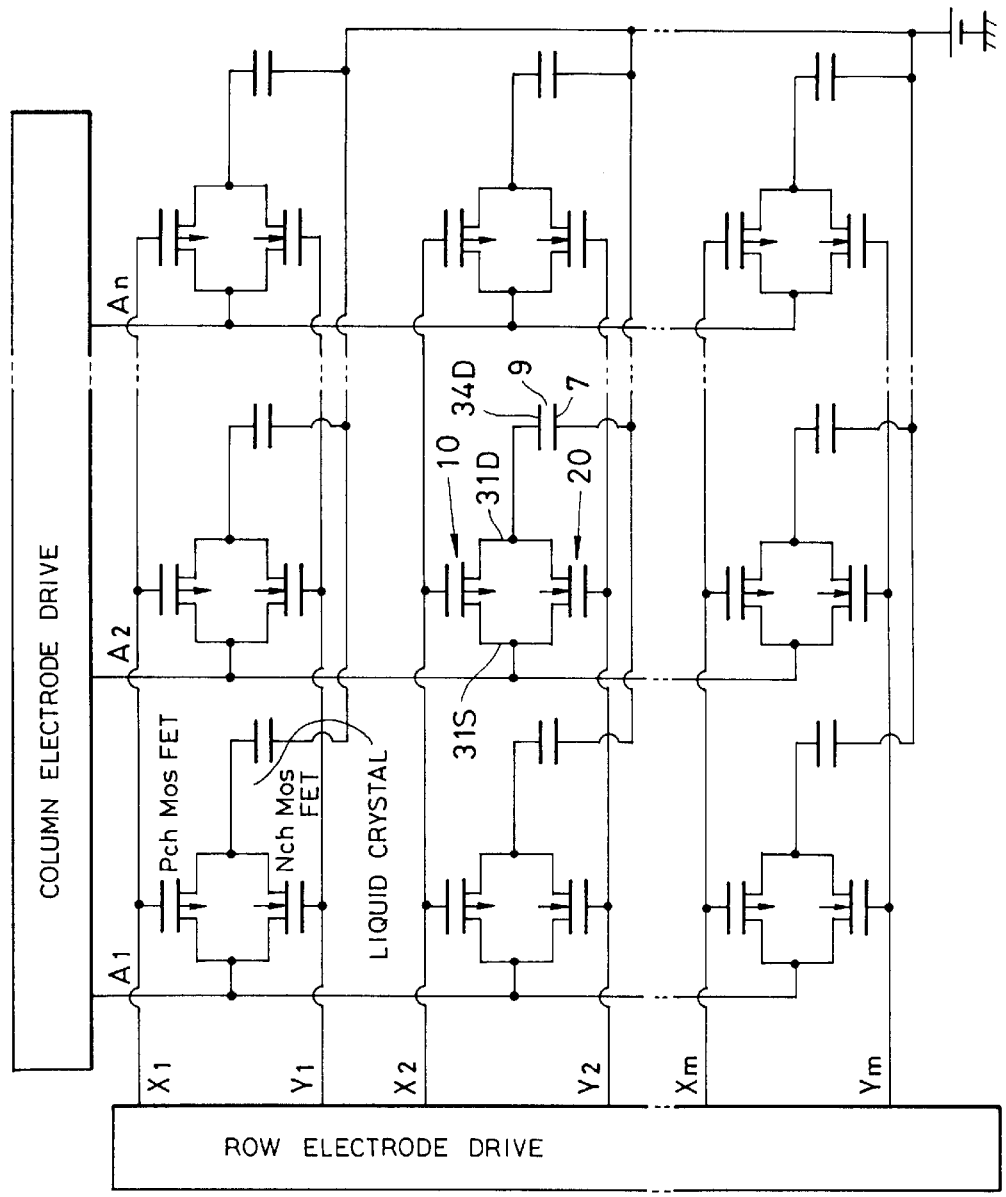
FIG. 2 is a block diagram showing an equivalent circuit for the reflective type liquid crystal display device according to the invention.
Figure 3:
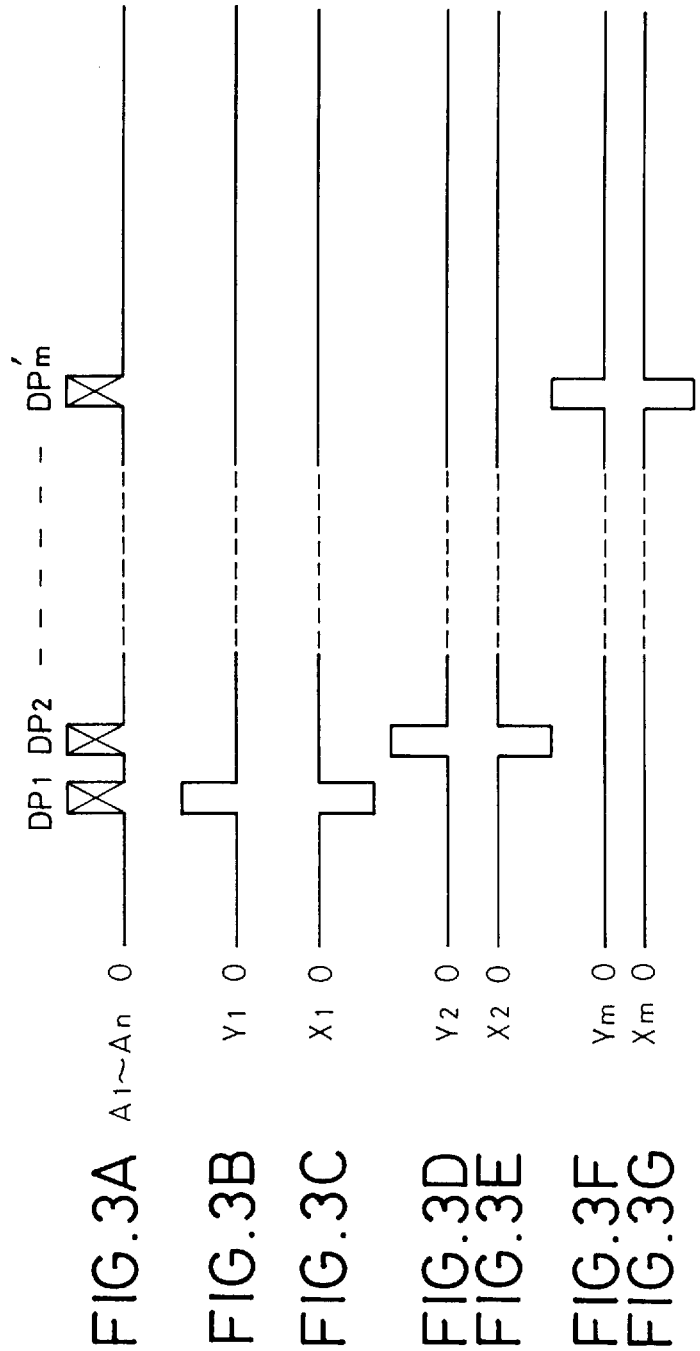
FIGS. 3A to 3G are waveforms of the drive-signals respectively in the reflective type liquid crystal display device according to the invention.
Figure 4:
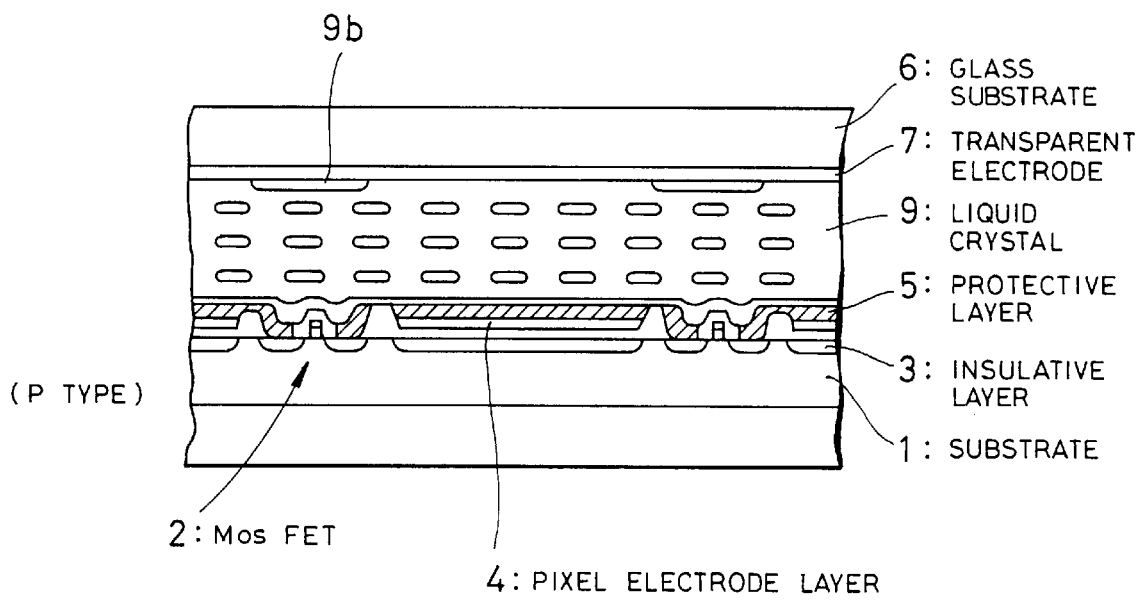
FIG. 4 is a cross-sectional view of a conventional reflective panel in a reflective type liquid crystal display device.

The concrete operation of the reflective type liquid crystal display device mentioned above will be explained with reference to the accompanying drawings. FIG. 2 is a block diagram showing an equivalent circuit for the reflective type liquid crystal display device according to the invention. FIGS. 3A to 3G are waveforms of the drive-signals respectively. The driving of the liquid crystal layer 9 is performed by a line-at-a-time active matrix system. That is, a column electrode driving circuit provides in parallel the data signals to the data lines A1 to An per one column line corresponding to one horizontal scanning line, and at the same time, the row electrode driving circuit provides one by one the scansignals or plus or minus signed pulses to the scan lines X1, Y1 and Xm, Ym, and the like for the particular horizontal scanning line. This pulse outputs are switched in turn from the lines X1, Y1, the lines X2, Y2, lines X3, Y3, to lines Xm, Ym per one horizontal scanning.

In this case of the pixel intersected by the 2nd column and the 2nd row, when the gate 12 of the P channel MOS transistor 10 in this pixel receives a negative scan pulse via the line X2 and, at the same time, the gate 22 of the N channel MOS transistor 20 receives a positive Iscan pulse via the line Y2, then the MOS transistors 10, 20 are ON states, so that the sources 12, 22 and the drains 13, 23 become in conduction. At this time, the output voltage of the data signal on the line A2 is applied through the source line 31S, the transistor 10, 20, the drain lines 31D, 32D, 33D to the pixel-electrodes 34D. Next, when the grounded potential is applied to both the gate 12 of the P channel MOS transistor 10 and the gate 22 of the N channel MOS transistor 20 and then the MOS transistors 10, 20 become in Off states, so that the data signal voltage is hold in the pixel-electrodes 34D. Thus, a portion of the liquid crystal layer 9 on the top portion of the pixel-electrodes 34D is changed in its polarization state in response to the voltage difference between the applied voltage of the pixel-electrodes 34D and the common voltage of the transparent electrodes 7. Therefore, the incident light irradiated from a light source (not shown) may be controlled in its ratio of the reflected light to a projection screen (not shown). The other pixels have similar operations as mentioned above.

In the reflective type liquid crystal display device having the structure and operation as mentioned above, since the orientation layers 8, 52 and the dielectric mirror 51 are porous, the transparent electrodes 7 touches the liquid crystal layer 9 as well as the pixel-electrodes 34D come in contact with the liquid crystal layer 9, so that the so-call battery-effect occurs. However, the direct current offset component (offset voltage) in the driving-voltage is reduced so that flicker is restricted. This is because the material of the pixel-electrodes 34D is selected in such a manner that the reference electric potential in the pixel-electrodes 34D generated due to the battery-effect with respect to the liquid crystal layer 9 is substantially the same as the reference electric potential in the transparent electrodes 7 generated with respect to the liquid crystal layer 9.

Next, various reflective type liquid crystal display devices were manufactured in which the LCD devices have substantially the same structure excepting materials of the pixel-electrodes are changed as shown in Table 1. After that, samples of examples and comparatives are measured in the offset voltage and the reference electric potential in the pixel-electrodes. These results are shown in Table 1.

TABLE 1

| Sample No. | Material of pixel electrode | Offset voltage | Reference electric potential |
| --- | --- | --- | --- |
| 1 | Tungsten (example) | −0.01V | −0.12V |
| 2 | Titanium (example) | −0.05V | −0.86V |
| 3 | Titanium nitride (example) | −0.08V | |
| 4 | Aluminum (comparative) | −0.3 V | −2.35V |
| 5 | Chromium (comparative) | −0.5 V | −1.33V |

As seen in Table 1, in the devices having the pixelectrodes made of metals (tungsten, titanium, titanium nitride), the offset voltage are reduced in which such metals have low reference electric potentials in comparison with aluminum.

In the reflective type liquid crystal display device according to the invention, each of the pixel-electrodes is made of a metal selected from a group of materials each generating an electric potential which is substantially the same as an electric potential occurring on each of the transparent electrodes. Therefore, the generation of the DC offset voltage is decreased in the display device, so that the generation of flicker may be prevented.

What is claimed is:

1. A reflective type liquid crystal display device with a panel comprising: a semiconductor substrate; a transparent substrate having a transparent electrode; a liquid crystal layer interposed between these substrates; switching elements being formed on said semiconductor substrate correspondingly to a pixel-array; and pixel-electrodes disposed in matrix over the switching elements correspondingly to said pixel-array, wherein each of said pixel-electrodes is made of a metal selected from a group of materials each generating an electric potential which is substantially the same as an electric potential occurring on said transparent electrode wherein the liquid crystal touches each of said pixel-electrodes and each of said transparent electrodes.

2. A reflective type liquid crystal display device according to claim 1, wherein said metal of said pixel-electrodes is made of tungsten or titanium nitride.

3. A reflective type liquid crystal display device according to claim 1, wherein said pixel-electrodes are covered with a porous dielectric mirror and a porous orientation layer.

* * * * *